United States Patent [19]

Streit

[11] 4,050,721
[45] Sept. 27, 1977

[54] REINFORCED PLASTIC PIPE

[75] Inventor: Kenneth F. Streit, Mount Prospect, Ill.

[73] Assignee: Phone-Ducs, Inc., North Chicago, Ill.

[21] Appl. No.: 694,180

[22] Filed: June 9, 1976

[51] Int. Cl.² ............................................. F16L 35/00
[52] U.S. Cl. ..................................... 285/93; 285/231; 285/345; 285/355; 285/423
[58] Field of Search ............... 285/423, 355, 390, 333, 285/334, 391, 93, 230, 231, 347, 345; 138/172; 277/207 A

[56] References Cited

U.S. PATENT DOCUMENTS

| 836,173 | 11/1906 | Burnstead | 285/391 X |
|---|---|---|---|
| 2,508,306 | 5/1950 | Thurston et al. | 285/333 X |
| 3,204,992 | 9/1965 | Walker | 285/333 X |
| 3,791,679 | 2/1974 | Glover | 285/405 |
| 3,794,364 | 2/1974 | Williams | 285/390 |
| 3,813,115 | 5/1974 | French | 285/355 X |

Primary Examiner—Dave W. Arola
Attorney, Agent, or Firm—Dressler, Goldsmith, Clement, Gordon & Shore, Ltd.

[57] ABSTRACT

A length of pipe conduit is provided for forming a joint arrangement on each end with adjacent lengths of like pipe or conduit. The length of pipe is formed of plastic with a structurally rigid wall having a middle portion presenting exterior circumferential reinforcing flanges at spaced intervals along the length of the pipe and longitudinal reinforcing ribs at spaced intervals about the exterior of the pipe. One end of the length of pipe has a round tubular wall presenting a sealing gasket and male section with thread rib segments. The other end of the length of pipe has a female section with thread groove segments for receiving and threadingly engaging the male section of a similar length of pipe. The thread rib and thread groove cross-section profiles are triangular. The radial distance from the center line of the pipe to the outer periphery of the exterior surface of the largest diameter region of the female section is equal to the radial distance from the center line of the pipe to the outer edges of the longitudinal reinforcing ribs and circumferential reinforcing flanges in the middle portion of the pipe to thereby provide aligned longitudinal support points for the length of pipe, including the joint region. Further, the longitudinal reinforcing ribs on the length of pipe are disposed relative to the threaded ends so that when two lengths of pipe are fully threadingly engaged, the longitudinal reinforcing ribs on each length are in alignment providing visual indication that full threading engagement has been achieved.

32 Claims, 5 Drawing Figures

Fig. 4.

REINFORCED PLASTIC PIPE

BACKGROUND OF THE INVENTION

This invention relates to pipe or conduit sections and more particularly, to lengths of reinforced plastic foam singlebore pipe that are joined together by a threading engagement and buried in the ground for use in transporting fluids, especially sewage.

In recent years, state and federal agencies have proposed and/or implemented regulations regarding tolerable leakage from underground sewage piping systems. Some organizations and municipal governments have also established standards regarding acceptable piping system head loss. Conventional piping systems for some types of sewage or liquid waste applications use clay, steel, or plastic pipe. Clay pipe has disadvantages in that close manufacturing tolerances are difficult to hold and leak-tight seals between adjacent pipe lengths are difficult to achieve. Some types of corrugated plastic and steel pipe do not have smooth interiors and thus offer an undesirable higher head loss. Thus, it is desirable to have a smooth interior on a strong pipe length that can be joined relatively easily and quickly with an adjacent pipe length to form a leak-tight seal.

It is known to join metal pipe or conduit by threaded end engagement. Examples of this are a U.S. Pat. to Barnstead No. 836,173 and a U.S. Pat. to Williams No. 3,794,364. Recently, lengths of plastic pipe have been disclosed which make use of integral reinforcing ribs or threaded end connections. Examples of these are the U.S. Pat. to French No. 3,813,115 and the U.S. Pat. to Glover, No. 3,791,679.

It has been found that, under certain circumstances, the use of these types of pipe is not entirely without disadvantages. A number of problems have been encountered.

First, due to ground settling beneath the pipe and shifting of pipe or conduit during back-filling, void areas beneath the pipe or conduit, particularly at the joint, have occurred. Thus, there is a need for the length of pipe or conduit to be structurally rigid and able to withstand the imposed bending and twisting forces. It is important that the joint region be strong and able to withstand these forces also.

Second, in the case of threaded joints, it is desirable that the installers of the piping system have a visual indication that adjacent pipe lengths or conduit lengths have been fully threadingly engaged.

Third, when laying pipe or conduit in an open trench, it is desirable that the lengths of pipe or conduit be essentially supported along their bottom points of contact in a substantially uniform manner to prevent canting or undue stress or an unsupported portion of the length of pipe or conduit.

Fourth, it is desirable to fabricate plastic pipe or conduit with a minimum use of plastic material. This objective can be achieved with novel design by (1) providing the pipe or conduit wall with reinforcing grid work to enable smaller wall thicknesses to be used, and (2) providing a thread design that conserves plastic material while still providing an effective and strong threaded engagement.

SUMMARY OF THE INVENTION

A length of pipe or conduit according to the present invention utilizes an enclosing wall or walls to provide an internal passageway for fluid. The enclosing wall or walls, for some portion of their length, need not be of a hollow cylindrical or round tubular shape, but may be of any suitable configuration. The term "pipe" will be used hereinafter in the description of this invention and it is to be understood to apply to non-cylindrical shapes.

The pipe presents a smooth interior bore to the fluid to reduce head loss. The connection of adjacent lengths of pipe is formed by use of a novel threaded engagement which is relatively fast and easy to make in the field. Further, a compressible gasket is employed at the connection of adjacent lengths of pipe to form a relatively positive leak-tight seal. In the preferred embodiment, a length of pipe is essentially a round tube having a male end portion, a middle portion and a female end portion.

The male end portion has a plurality of protuberant helical thread rib segments on the exterior of the tubular wall. The thread rib segments have a triangular cross-sectional profile and present one surface perpendicular to the exterior surface of the tubular wall for carrying the longitudinal threading bearing forces and another surface disposed at an angle to, and merging with, the exterior surface of the tubular wall. The thread shape, having only two surfaces presenting a non-curved profile, is obviously less complex than the curved and/or multi-sided threads in use today. Further, this particular thread shape uses less material than some other thread shapes.

For providing a leak-tight seal, the distal end of the male end of the length of pipe has an annular groove containing a gasket.

The female end portion of a length of pipe has indented helical thread groove adapted for receiving and threadingly engaging the protuberant helical thread rib segments of the male end portion of another length of similar pipe.

The middle portion of the length of pipe lies between the male and female ends and has exterior circumferential reinforcing flanges disposed at spaced intervals along the length of the pipe to provide stiffening. Intersecting these flanges in a grid-like manner are a plurality of integral, exterior longitudinal reinforcing ribs disposed at spaced intervals about the circumference of the tubular wall to provide stiffening. The height of the flanges and the height of the reinforcing ribs are equal. Further, the distal edges of the reinforcing flanges and ribs extend to a distance from the center line of the pipe that is equal to the distance from the center line of the pipe to the maximum exterior radius of the female end. This provides an exterior line of aligned support points along the length of the pipe so that when the pipe is placed in a trench, the entire middle portion and female end is support at the same elevation. It should be noted that the male end of an adjacent length of pipe is inserted into the female end of an adjacent length of pipe. Since the exterior radius of the female end equals the exterior radius of the middle portion of the length of pipe, uniform elevation support is given to the joint region at each end as well as to the middle portion.

The longitudinal reinforcing ribs are disposed about the circumference of the tubular wall in relation to the thread segments on either end such that when two lengths of pipe are threadingly engaged to the full extent allowed by the threads, the longitudinal ribs on both lengths of pipe become aligned, thereby providing visual indication of complete threading engagement.

The novel reinforcing gridwork construction permits the length of pipe to be easily adapted to be connected with certain types of dissimilar lengths of pipe, or with fittings, which have bell and spigot ends. At a piping system interface, where it is desired to connect a piping system using pipe of the present invention with another piping system using pipe having bell and spigot type joints, the interfacing end of the length of pipe of the present invention can be cut between the middle portion and the threaded male or female end, or anywhere in the middle portion, to sever the threaded male or female end section from the remaining length of pipe. Then, a circular gasket having one or more U-shaped channels, each adapted for fitting over a circumferential reinforcing flange, can be applied to the remaining end of the middle portion. This gasket has an exterior diameter sufficient to form a leaktight seal when the end of length of pipe, with applied gasket, is inserted into the bell end of a length of adjacent pipe of the other piping system.

Numerous other advantages and features of the present invention will become readily apparent from the following detailed description of the invention and of one embodiment thereof, from the claims and from the accompanying drawings in which each and every detail shown is fully and completely disclosed as a part of this specification.

BRIEF DESCRIPTION OF THE DRAWINGS

In the accompanying drawings forming part of the specification, and in which like numerals are employed to designate like parts throughout the same.

DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Figure 1:
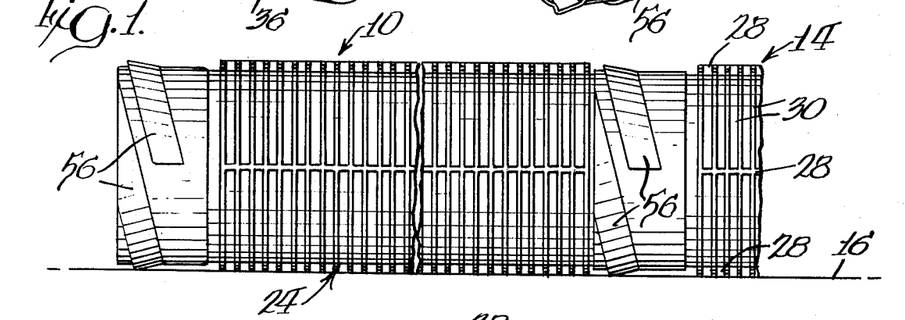
FIG. 1 is a broken elevation view illustrating a length of pipe of the present invention, threadingly engaged with an adjacent length of pipe.

Referring to FIG. 1, a length of pipe 10 is shown threadingly engaged with another length of pipe 14. Both lengths of pipe 10 and 14 are shown lying on a flat surface 16 such as a prepared bed in a trench or ditch. Each length of pipe is preferably made from a high-impact structural foam plastic, such as linear polyethylene which may be conveniently formed by injection molding into a tubular structure of generally uniform wall thickness. When fabricated in this manner, the surface of the wall of the pipe are more dense than the interior part of the wall. This provides smoother, abrasion resistant surfaces.

Figure 2:
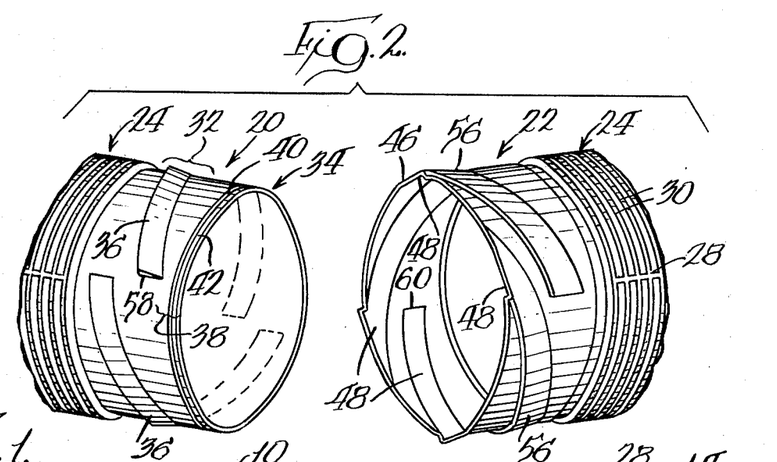
FIG. 2 is a perspective view of the female end and of the male end of a length of pipe.

Each pipe length is provided with a first end portion 20 and a section end portion 22 as illustrated in FIG. 2. A middle portion 24 lies between the first end portion 20 and the second end portion 22 and comprises the greater portion of the entire length of pipe. The first end portion 20, the second end portion 22, and the middle portion 24 are substantially round and tubular in shape.

Figure 4:
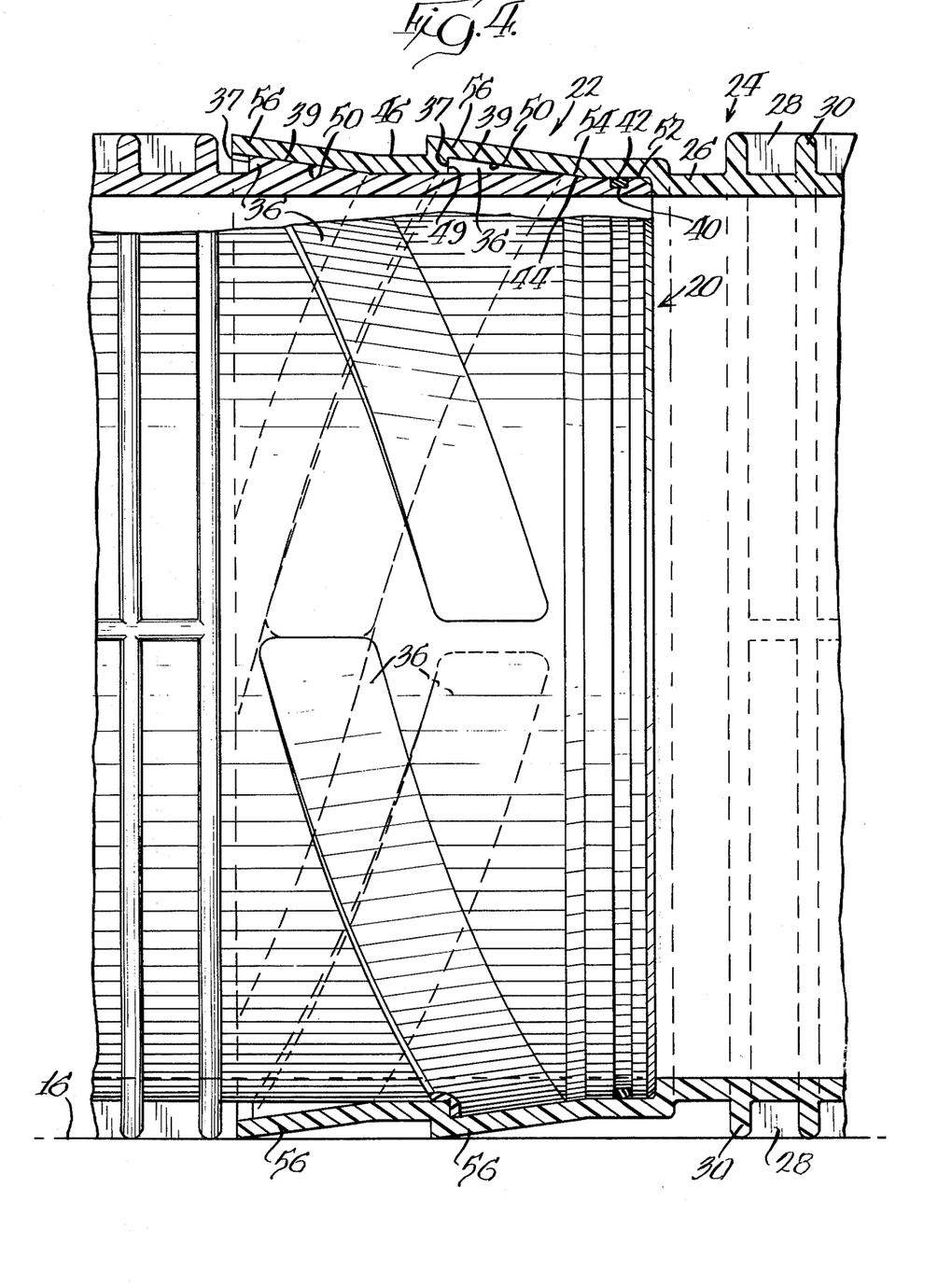
FIG. 4 is an enlarged partial sectional view of the joint between adjacent pipe lengths secured together by threading engagement.

Referring now to the right-hand side of FIG. 4, the tubular wall 26 of the middle portion 24 of the length of pipe is shown in cross-section. The tubular wall presents a generally uniform mean, or average, internal diameter for the longitudinal extent of the middle portion 24. On the exterior periphery of the tubular wall 26 are provided integral exterior longitudinal reinforcing ribs 28 disposed at spaced intervals about the exterior circumference of the middle portion 24. Also on the exterior of tubular wall 26 are provided integral peripheral circumferential reinforcing flanges 30 disposed at spaced intervals along the length of the middle portion 24. The reinforcing ribs 28 and the reinforcing flanges 30 form an intersecting connected structural reinforcing grid work about the middle portion 24. As can be seen in FIGS. 1 and 4, the height of the reinforcing ribs 28 is equal to the height of the reinforcing flanges 30. This provides a uniform array of contact points along the length of middle portion 24 when the length of pipe is lying on a flat surface such as shown in FIG. 1.

The first end portion 20 has a wall with a generally annular transverse cross-section presenting an exterior threaded male section 32 inwardly of the distal end 34. On the exterior surface of the threaded male section 32 are provided a plurality of protuberant helical thread rib segments 36. Four thread rib segments 36 are spaced about the circumference of the threaded male section. As can be seen in FIG. 2, the thread rib segments 36 are spaced about the circumference of the threaded male section 32 on 90° circumferential arcs and in a helical thread pattern. As further illustrated in FIGS. 2 and 4, the thread rib segments 36 present two exterior side surfaces: one side surface 37 perpendicular to a line tangent to the exterior surface of the tubular wall, and one side surface 39 disposed at an angle to, and merging with, the exterior surface of the tubular wall. Thus, the shape to the cross-sectional profile of the protuberant helical thread rib segment is that of a right triangle as viewed in FIG. 4.

Figure 3:
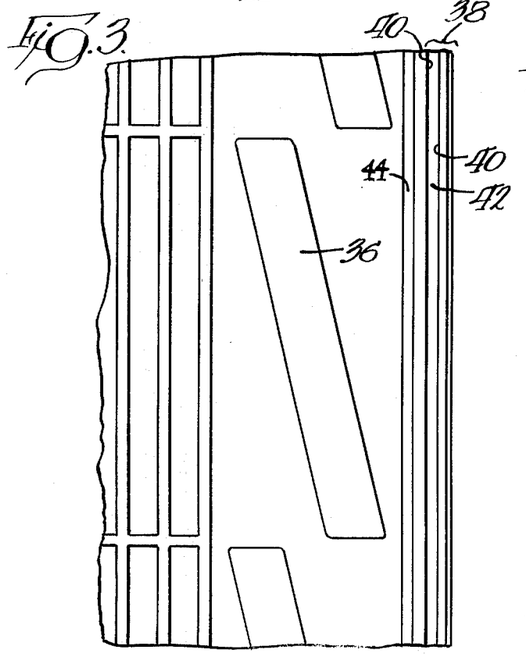
FIG. 3 is a developed plan view of the male end portion of the length of pipe showing the protuberant helical thread rib segments.

Between the threaded male section 32 and the distal end 34 of first end portion 20 is a cylindrical end portion 38 containing an annular groove 40 with a gasket 42 disposed within annular groove 40. This provides a leak-tight seal as will be described hereinafter. The exterior surface of the cylindrical end portion 38 has a diameter slightly smaller than the exterior surface of the threaded male section 32. That is, the exterior diameter of the cylindrical end portion 38 is slightly less than the diameter of the root circle of the thread rib segments 36. The diameter reduction from the threaded male section 32 to the cylindrical end portion 38 is achieved with a frusto-conical transition surface 44 as best illustrated in FIGS. 3 and 4.

Second end portion 22 has a substantially round transverse cross-section and is formed from a tubular wall 46. As seen in the cross-section view of FIG. 4, the internal diameter of tubular wall 46 is larger than, and adapted to accommodate, the exterior surface of first end portion 20. On the interior surface of the tubular wall 46 of the second end portion 22 are provided a plurality of indented helical thread groove segments 48 adapted for receiving and threadingly engaging the thread rib segments 36 of the first end portion 20 of another length of pipe. The shape of the cross-sectional profile of the thread groove segments 48 is the same as that of the thread rib segments 36. As can be seen in FIGS. 2 and 4, each thread groove segment 48 has one side surface 49 perpendicular to a line tangent to the interior round surface of the tubular wall 46 and one side surface 50 disposed at an angle to, and merging with, interior round surface of the tubular wall 46. When the first end portion 20 of a length of pipe is received in, and threadingly engaged with, a second end portion 22 of an adjacent length of pipe, the perpendicular surfaces, 37 and 49, of the thread groove segment 48 and the engaged thread rib segment 36, respectively, are in abutting relationship and provide a shear resistant interlock in response to longitudinal force tending to pull apart the lengths of pipe.

As shown in FIG. 2, each thread rib segment 36 terminates at its leading end in a flat end surface 58 normal to the exterior surface of the tubular wall of the pipe and each thread groove segment 48 terminates at its trailing end in flat end surface 60 normal to the interior surface of the tubular wall. The threaded connection of two lengths of pipe is fully engaged and complete when the thread rib segment flat end surface 58 abuts the thread groove segment flat end surface 60 for each of the four pairs of engaged and cooperating rib/groove segments.

As seen in FIG. 4, the second end portion 22 has, between the thread groove segments 48 and middle portion 24, a reduced diameter portion presenting a cylindrical gasket seating surface 52 which cooperates to receive gasket 42 in cylindrical end portion 48 of the first end portion 20 of an adjacent length of pipe. A leak-tight seal is thus formed. Providing a compressive lead-in for gasket 42 is a frustoconical gasket lead-in surface 54 which cooperatively receives and mates with the frusto-conical transition surface 44 of the first end portion 20 of the adjacent length of pipe.

As can be seen in FIGS. 1 and 4, protuberances 56 on the exterior surface of the second end portion 22 conform to the location and shape of the thread groove segment 48. However, it should be noted that these protuberances 56 on the exterior surface of the second end portion 22 extend to the same height as the edges of the longitudinal reinforcing ribs or the reinforcing flanges. More precisely, in the transverse planes of greatest exterior surface diameter (i.e., measured to the outer surface of the protuberances 56), the exterior surface of the second end portion 22 is at the same radial distance from the pipe center line at is the exterior surface of the edges of the reinforcing ribs 28 and flanges 30. This provides an alignment of longitudinal support points along the second end portion 22 and middle portion 24 of the length of pipe. This provides support along the bottom of the length of pipe resting upon a flat surface 16 (FIG. 1) such as a prepared bed in a trench or ditch. The closely spaced support points provide especially proper and adequate support at the joint location where the first end portion 20 of one length of pipe is received in threading engagement with the second end portion 22 of an adjacent length of pipe. This support prevents undue stresses along the length of pipe and/or at the joint area.

By appropriate placement of the longitudinal reinforcing ribs 28 with respect to the thread rib segments 36 and thread groove segments 48, the longitudinal reinforcing ribs 28 on two adjacent, joined lengths of pipe will be in alignment when the lengths of pipe have been fully threadingly engaged as described above. This furnishes visual indication to the installer of the lengths of pipe that full thread engagement has been achieved.

When the length of pipe of this invention is laid in a trench on a prepared bed of crushed rock, it is desirable that the rock not project into, or become wedged between, adjacent reinforcing ribs and flanges. Thus, the spacing between the ribs and flanges is of the predetermined maximum dimension to prevent such a problem. With the preferred embodiment illustrated in the figures, for a pipe having an 8 inch nominal inside diameter and a 0.37 inch wall, the width of each longitudinal rib and circumferential flange is typically 0.163 inches, and the distance between center lines of adjacent circumferential reinforcing flanges is 0.638 inches.

In the preferred embodiment, the circular pitch of the thread groove segments and thread rib segments is 1.785 inches where the thread rib segments extend 90° circumferentially at a helix angle of 15°. With respect to the right triangle shaped cross-sectional thread profile, the surface of the thread segment opposite the right angle merges with the surface of the tubular wall at an included angle of 8° and 42 minutes.

Figure 5:
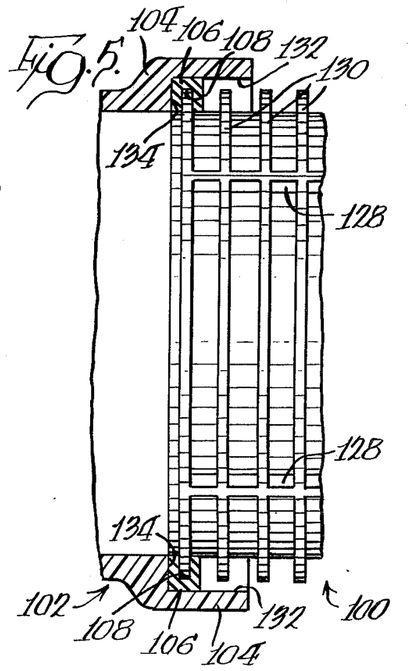
FIG. 5 is an enlarged partial sectional view of a channel-flange gasketed joint between a length of cut pipe of the present invention and a length of pipe having a bell end.

The novel reinforcing gridwork construction on the exterior of the length of pipe of the present invention affords a mechanism whereby the length of pipe may be easily adapted to be connected with certain types of dissimilar lengths of pipe with fittings which have bell and spigot ends. For example, at a piping system interface, where it is desirable to connect a piping system using the product of the present invention with another piping system using pipe having bell and spigot type joints, the interfacing end of the length of pipe of the present invention can be adapted to sealingly engage with the bell end of a length of adjacent pipe of the other piping system. FIG. 5 illustrates such a joint wherein the length of pipe of the present invention is designated generally by reference numeral 100 and the length of adjacent pipe having a bell end is designated generally by reference numeral 102. The length of pipe 102 may be in many ways dissimilar to the length of pipe 100 of the present invention. The length of pipe 102 of the other system may be made of a variety of materials, such as steel, concrete or plastic. Further, the internal passageway through the length of pipe 102 may be cylindrical, prismatic, or multi-cavitied. For an effective joint, all that is required is that the end bell portion 104 of the length of pipe 102 be large enough to accommodate the gasketed joint with lengths of pipe 100 as will herein be described.

Length of pipe 100 is illustrated in FIG. 5 as having been adapted to form a joint with the bell portion 104 of length of pipe 102. The adaptation consists, in part, of cutting a length of pipe, such as length of pipe 10 illustrated in FIGS. 1 and 2, between the middle portion 24 and either the threaded male end 20 or the threaded female end 22 or anywhere in the middle portion, to thus sever the end from the remaining length of pipe.

A channeled circular gasket 106 is then applied to the remaining "cut" end of the length of pipe 100. Gasket 106 is preferably made of a resilient material. The gasket 106 is substantially circular and has an inner channel 108 adapted to receive a circular, or circumferential reinforcing flange 130. Thus, in cross-section, the gasket 106 is U-shaped. The gasket 106 could also have multiple channels 108 so that the gasket could receive a multiple of circumferential reinforcing flanges 130. In the preferred embodiment, a slot (not shown) is formed at four places in a portion of the gasket 106 to receive the four exterior longitudinal reinforcing ribs 128. After application of the gasket 106 to the end of the length of pipe 100, the end of the length of pipe 100 is inserted into the bell portion 104 of the length of pipe 102. A part of the peripheral exterior surface of gasket 106 sealingly engages the internal cylindrical surface 132 of the bell portion 104 of the length of pipe 102 to form a leak-tight joint. As illustrated in FIG. 5, part of the peripheral exterior surface of gasket 106 may also engage the bell internal end surface 134. With pipe of this invention made of plastic, it is relatively easy, even in the field, to cut the end of the pipe, apply the gasket, and make the leak-tight joint. No adhesives, glues, solvents, liquid gasket preparations, threading or bolting are required.

While the preferred embodiment is illustrated as being an essentially round tube over its entire length, it is possible to incorporate the features of this invention in a length of pipe in which the middle portion has a non-circular interior or a non-circular exterior, or both. Further, the precise shape of the exterior integral reinforcing flanges and ribs can be varied. It is also possible to vary the number and spacing of the thread rib segments and thread groove segments.

The length of pipe of this invention can be fabricated in lengths other than those having a single, straight line longitudinal axis. For example, a length of pipe can be in the form of conventional pipe fittings such as an ell, Y reducer, tee, lateral and the like. Likewise, a pipe as disclosed herein can be connected to a fitting or the like, by cutting the pipe length, and by connecting the cut pipe length to the fitting in the manner shown in FIG. 5.

From the foregoing, it will be observed that numerous variations and modifications may be effected without departing from the true spirit and scope of the novel concept of the invention. It is of course, intended to cover by the appended claims all such modifications as fall within the scope of the claims.

I claim:

1. A length of plastic pipe comprising:

a first end portion, a middle portion, and a second end portion, said middle portion having middle wall means for forming a passageway, a plurality of integral, exterior peripheral reinforcing flanges disposed at spaced intervals along the length of said middle wall means to provide stiffening, and a plurality of integral, longitudinal reinforcing ribs disposed at spaced intervals about the exterior of said middle wall means to provide stiffening, the height of said peripheral flanges being equal to the height of said longitudinal ribs, said first end portion having a first end tubular wall of generally annular transverse cross-section and presenting a threaded male section having a plurality of protuberant helical thread rib segments on the exterior of said tubular wall, each rib segment having one side surface perpendicular to the exterior surface of said first end tubular wall for carrying the longitudinal threading bearing forces and one side surface disposed at an angle to, and merging with, the exterior surface of said first end tubular wall, each rib segment extending for a portion of the circumference of said wall thereon, said first end portion further having, between the distal end thereof and said threaded male section, a cylindrical end portion containing an annular groove in the exterior surface of said tubular wall and having a resilient gasket disposed within said annular groove, said second end portion having a second end wall means for forming an internal passageway of generally round transverse cross-section, a part of the exterior surface of said second end portion and the edges of parts of said circular flanges and longitudinal ribs lying along a line parallel to a longitudinal axis of said pipe thereby providing aligned longitudinal support points when said pipe is layed on a support surface, said second end portion presenting a threaded female section having a plurality of indented helical thread groove segments in the interior round surface of said second end wall means, each groove segment having one side surface perpendicular to the interior round surface of said second end wall means for carrying the longitudinal threading bearing forces and one side surface disposed at an angel to, and merging with, the interior round surface of said second wall means, each groove segment extending for a portion of the circumference of said wall thereon, whereby said second end portion is adapted to receive a first end portion of another length of similar pipe which is inserted therein and turned for causing threading engagement between the threaded male and female sections to establish a connection therebetween.

2. The length of plastic pipe in accordance with claim 1 in which said reinforcing rib segments are disposed at equally spaced intervals about the exterior of said middle wall means relative to said thread rib and groove segments, whereby when said length of pipe is joined in full threaded engagement with a similar length of pipe, the reinforcing ribs of both lengths of pipe are in alignment.

3. The length of plastic pipe in accordance with claim 1 in which said thread rib segments are equally circumferentially spaced apart and each extend 90° about the circumference of said male section.

4. The length of plastic pipe in accordance with claim 1 in which said cylindrical end portion of said first end portion has an exterior diameter less than the diameter of the root circle of said thread rib segments and in which said second end portion has, between said middle portion and said threaded female section, a cylindrical gasket seating surface with a diameter less than the diameter of the portion of the interior round surface of said second end wall means containing said groove segments, said cylindrical seating surface being joined to said portion of the interior round surface of said second end wall means containing said groove segments by a frusto-conical gasket lead-in surface whereby, when said second end portion receives a first end portion of another similar pipe which is inserted therein and turned for causing threaded engagement, a gasket of the other pipe becomes compressed by said frusto-conical gasket lead-in surface before entering and seating in said cylindrical gasket seating surface.

5. The length of plastic pipe in accordance with claim 1 in which said gasket is an o-ring.

6. The length of plastic pipe in accordance with claim 1 in which each said thread rib segment and each said groove segment has a triangular cross-sectional profile.

7. The length of plastic pipe in accordance with claim 6 in which said profile is a right triangle.

8. The length of plastic pipe in accordance with claim 7 in which the side surface of each said thread rib segment perpendicular to the exterior surface of said first end tubular wall faces away from the distal end of said first end portion and in which the side surface of each said groove segment perpendicular to the interior round surface of said second end wall means faces away from the distal end of said second end portion whereby, when said second end portion receives a first end portion of another similar pipe which is inserted therein and turned for causing threaded engagement, said perpendicular side surface of each said thread rib segment abuts the perpendicular side surface of an engaging groove segment to provide shear resistant interlock in response to longitudinal force tending to pull said lengths of pipe apart.

9. The length of plastic pipe in accordance with claim 8 in which the leading end of each said thread rib segment terminates in a flat end surface normal to the exterior surface of said first end tubular wall and the trailing end of each said thread groove segment terminates in a flat end surface normal to the interior surface of said second end wall means, whereby when said length of pipe is joined in full threaded engagement with a similar length of pipe, said thread rib flat end surface of one length of pipe abuts the thread groove flat end surface of the other length of pipe to provide a threading stop.

10. A length of plastic pipe comprising:
a tubular wall having a first end portion, a middle portion, and a second end portion,
said middle portion having a generally round transverse cross-section, a uniform mean internal diameter for the longitudinal extent thereof, a plurality of integral, exterior peripheral circular reinforcing flanges disposed at spaced intervals along the longitudinal axis of the tubular wall to provide stiffening, and a plurality of integral longitudinal reinforcing ribs disposed at spaced intervals about the external circumference of the tubular wall to provide stiffening, the height of said circular flanges being equal to the height of said longitudinal ribs,
said first end portion having a generally round transverse cross-section and presenting a threaded male section having a plurality of protuberant helical thread rib segments on the exterior of said tubular wall, each thread rib having one side surface perpendicular to the exterior surface of said tubular wall for carrying the longitudinal threading bearing forces and one side surface disposed at an angle to, and merging with, the exterior surface of said tubular wall, each thread rib segment extending for a portion of the circumference of said wall thereon, said first end portion further having, between the distal end thereof and said threaded male section, a cylindrical end portion containing an annular groove in the exterior surface of said tubular wall and having a resilient gasket disposed within said annular groove,
said second end portion having a generally round transverse cross-section, the maximum exterior diameter of said second end portion being equal to the diameter of said middle portion of said tubular wall as measured to the peripheral edges of said circular flanges and longitudinal ribs thereby providing aligned longitudinal support points when said pipe is layed on a support surface, said second end portion presenting a threaded female section having a plurality of indented helical thread groove segments in the interior surface of said tubular wall, each groove segment having one side surface perpendicular to the interior surface of said tubular wall for carrying the longitudinal threading bearing forces and one side surface disposed at an angle to, and merging with, each groove segment extending for a portion of the circumference thereon, whereby said second end portion is adapted to receive a first end portion of another length of similar pipe which is inserted therein and turned for causing threading engagement between the threaded male and female sections to establish a connection therebetween.

11. The length of plastic pipe in accordance with claim 10 in which said reinforcing rib segments are disposed at equally spaced intervals about the exterior of said tubular wall middle portion relative to said thread rib and groove segments, whereby when said length of pipe is joined in full threaded engagement with a similar length of pipe, the reinforcing ribs of both lengths of pipe are in alignment.

12. The length of plastic pipe in accordance with claim 11 in which four reinforcing ribs are disposed about the exterior of said tubular wall.

13. The length of plastic pipe in accordance with claim 10 in which said thread rib segments are equally circumferentially spaced apart and each extends 90° about the circumference of said male section.

14. The length of plastic pipe in accordance with claim 10 in which said cylindrical end portion of said first end portion has an exterior diameter less than the diameter of the root circle of said thread rib segments and in which said second end portion has, between said middle portion and said threaded female section, a cylindrical gasket seating surface with a diameter less than the diameter of the portion of the interior tubular wall surface containing said groove segments, said cylindrical seating surface being joined to said portion of the interior tubular wall surface containing said groove segments by a frusto-conical gasket lead-in surface whereby, when said second end portion receives a first end portion of another similar pipe which is inserted therein and turned for causing threaded engagement, a gasket of the other pipe becomes compressed by said frusto-conical gasket lead-in surface before entering and seating in said cylindrical gasket seating surface.

15. The length of plastic pipe in accordance with claim 10 in which said gasket is an o-ring.

16. The length of plastic pipe in accordance with claim 10 in which each said thread rib segment and each said groove segment has a triangular cross-sectional profile.

17. The length of plastic pipe in accordance with claim 16 in which said profile is a right triangle.

18. The length of plastic pipe in accordance with claim 17 in which the side surface of each said thread rib segment perpendicular to the exterior surface of said tubular wall faces away from the distal end of said first end portion and in which the side surface of each said groove segment perpendicular to the interior surface of said tubular wall faces away from the distal end of said second end portion whereby, when said second end portion receives a first end portion of another similar pipe which is inserted therein and turned for causing threaded engagement, said perpendicular side surface of each said thread rib segment abuts the perpendicular side surface of an engaging groove segment to provide a shear resistant interlock in response to longitudinal force tending to pull said lengths of pipe apart.

19. A length of plastic pipe in accordance with claim 18 in which the leading end of each said thread rib segment terminates in a flat end surface normal to the exterior surface of said tubular wall and the trailing end of each said thread groove segment terminates in a flat end surface normal to the interior surface of said tubular wall, whereby when said length of pipe is joined in full threaded engagement with a similar length of pipe, said thread rib flat end surface of one length of pipe abuts the thread groove flat end surface of the other length of pipe to provide a threading stop.

20. A plastic pipe arrangement comprising:
a first pipe length and a second pipe length connected with said first pipe length, each said pipe length comprising a tubular wall having a first end portion, a middle portion, and a second end portion; said middle portion having a generally round transverse cross-section, a uniform mean internal diameter for the longitudinal extent thereof, a plurality of integral, exterior peripheral circular reinforcing flanges disposed at spaced intervals along the longitudinal axis of the tubular wall to provide stiffening, and a plurality of integral longitudinal reinforcing ribs disposed at spaced intervals about the external circumference of the tubular wall to provide stiffening, the height of said circular flanges being equal to the height of said longitudinal ribs; said first end portion having a generally round transverse cross-section and presenting a threaded male section having a plurality of protuberant helical thread rib segments on the exterior of said tubular wall, each thread rib segment having one side surface perpendicular to the exterior surface of said tubular wall for carrying the longitudinal threading bearing forces and one side surface disposed at an angle to, and merging with, the exterior surface of said tubular wall, each thread rib segment extending for a portion of the circumference of said wall thereon, said first end portion further having, between the distal end thereof and said threaded male section, a cylindrical end portion containing an annular groove in the exterior surface of said tubular wall and having a resilient gasket disposed within said annular groove; said second end portion having a generally round transverse cross-section, the maximum exterior diameter of said second end portion being equal to the diameter of said middle portion of said tubular wall as measured to the peripheral edge of said circular flanges and longitudinal ribs thereby providing aligned longitudinal support points when said pipe is alyed on a support surface, said second end portion presenting a threaded female section having a plurality of indented helical thread groove segments in the interior surface of said tubular wall, each groove segment having one surface perpendicular to the interior surface of said tubular wall for carrying the longitudinal threading bearing forces and one surface disposed at an angle to, and merging with, the interior surface of said tubular wall, each groove segment extending for a portion of the circumference of said wall thereon, said second end portion of said first pipe length receiving the first end portion of said second pipe length which is inserted therein and turned for causing threading engagement between the threaded male and female sections to establish connection therebetween, said longitudinal reinforcing ribs on each pipe length being in alignment for thereby indicating full threaded engagement of said first and second pipe lengths.

21. The plastic pipe arrangement in accordance with claim 20 in which said thread rib segments are equally circumferentially spaced apart and each extends 90° about the circumference of said male section.

22. The plastic pipe arrangement in accordance with claim 20 in which said cylindrical end portion of said first end portion has an exterior diameter less than the diameter of the root circle of said thread rib segments and in which said second end portion has, between said middle portion and said threaded female section, a cylindrical gasket seating surface with a diameter less than the diameter of the portion of the inerior tubular wall surface containing said groove segments, said cylindrical seating surface being joined to said portion of the interior tubular wall surface containing said groove segments by a frusto-conical gasket lead-in surface whereby, when said second end portion of said first pipe length receives the first end portion of second pipe length which is inserted therein and turned for causing threaded engagement, a said gasket of the first pipe length becomes compressed by said frusto-conical gasket lead-in surface before entering and seating in said cylindrical gasket seating surface.

23. The plastic pipe arrangement in accordance with claim 20 in which said gasket is an o-ring.

24. The plastic pipe arrangement in accordance with claim 20 in which each said thread rib segment and each said groove segment has a triangular cross-sectional profile.

25. The plastic pipe arrangement in accordance with claim 24 in which said profile is a right triangle.

26. The plastic pipe arrangement in accordance with claim 25, in which the side surface of each said thread rib segment perpendicular to the exterior surface of said tubular wall faces away from the distal end of said first end portion and in which the side surface of each said groove segment perpendicular to the interior surface of said tubular wall faces away from the distal end of said second end portion whereby, when said second end portion of said first pipe length receives the first end portion of said second pipe length which is inserted therein and turned for causing threaded engagement, said perpendicular side surface of each said thread rib segment abuts the perpendicular side surface of an engaging groove segment to provide a shear resistant interlock in response to longitudinal force tending to pull said lengths of pipe apart.

27. The plastic pipe arrangement in accordance with claim 26 in which the leading end of each said thread rib segment terminates in a flat end surface normal to the exterior surface of said tubular wall and the trailing end of each said thread groove segment terminates in a flat end surface normal to the interior surfae of said tubular wall, whereby when said first pipe length is joined in full threaded engagement with said second pipe length, said thread rib flat end surface of said second pipe length abuts the thread groove flat end surface of said first pipe length to provide a threading stop.

28. A pipe connection comprising a first pipe length having a tubular wall presenting a generally round transverse cross-section, a uniform means internal diameter for the longitudinal extend thereof, a plurality of integral, exterior peripheral cicular reinforcing flanges disposed at spaced intervals along the longitudinal axis of the tubular wall to provide stiffening of the length of pipe, and a plurality of integral longitudinal reinforcing ribs disposed at spaced intervals about the external circumference of the tubular wall to provide stiffening of the length of pipe, the height of said circular flanges being equal to the height of said longitudinal ribs; a second pipe length having a bell end portion, the inner diameter of said bell end portion being larger than the outer diamter of one end of said first pipe length and said bell end portion receiving said one end of said first pipe length therewithin; a gasket disposed on said one end of said first pipe length, said gasket having at least one inwardly opening channel receivng one of said exterior peripheral circular reinforcing flanges in sealing engagement and having a part of its exterior surface sealingly engaging a part of the internal surface of said bell portion of said second pipe length.

29. A pipe connection in accordance with claim 28 in which said first pipe length is plastic.

30. A pipe connection in accordance with claim 28 in which said gasket is resilient.

31. A pipe connection in accordance with claim 28 in which said inwardly opening channel is substantially U-shaped.

32. A pipe connection in accordance with claim 28 in which said gasket has slots for receiving said longitudinal reinforcing ribs.

* * * * *

UNITED STATES PATENT AND TRADEMARK OFFICE
CERTIFICATE OF CORRECTION

PATENT NO. : 4,050,721
DATED : September 27, 1977
INVENTOR(S) : Kenneth F. Streit It is certified that error appears in the above–identified patent and that said Letters Patent are hereby corrected as shown below:

Column 2, line 32, after "groove", insert -- segments --.

line 52, "support" should be -- supported --.

Column 8, line 20, "angel" should be -- angle -- .

Column 9, line 12, after "provide" insert -- a --.

line 44, after "rib" insert -- segment --.

Column 11, line 51, "alyed" should be -- layed -- .

Column 12, line 64, "extend" should be -- extent -- .

Signed and Sealed this

Eleventh Day of April 1978

[SEAL]

Attest:

RUTH C. MASON
*Attesting Officer*

LUTRELLE F. PARKER
*Acting Commissioner of Patents and Trademarks*